United States Patent [19]

Nelson et al.

[11] 4,050,534
[45] Sept. 27, 1977

[54] DRIVE AXLE SYSTEM USEABLE IN 6 × 6 VEHICLE

[75] Inventors: Robert K. Nelson, Shaker Heights; James F. Mueller, Lakewood, both of Ohio

[73] Assignee: Eaton Corporation, Cleveland, Ohio

[21] Appl. No.: 708,445

[22] Filed: July 23, 1976

Related U.S. Application Data

[63] Continuation of Ser. No. 549,592, Feb. 13, 1975, abandoned.

[51] Int. Cl.² ........................................... B60K 17/16
[52] U.S. Cl. ............................ 180/24.09; 74/711; 180/44 R
[58] Field of Search ............ 180/24.09, 23, 44 R; 74/15.2, 15.88, 710.5, 711, 665 GC, 665 GA

[56] References Cited

U.S. PATENT DOCUMENTS

| 2,395,108 | 2/1946 | Donley | 180/22 |
|---|---|---|---|
| 3,000,456 | 9/1961 | Christie | 180/24.09 |
| 3,095,758 | 7/1963 | Bixby | 180/44 R X |
| 3,378,093 | 4/1968 | Hill | 180/44 R |
| 3,753,376 | 8/1973 | Ribeiro | 74/665 GA |
| 3,828,877 | 8/1974 | Fogelberg | 180/44 R |

*Primary Examiner*—Philip Goodman
*Assistant Examiner*—Terrance L. Siemens
*Attorney, Agent, or Firm*—Teagno & Toddy

[57] ABSTRACT

A drive axle system of the type useable in a 6 × 6 vehicle, especially one utilizing a tandem axle assembly to transmit torque from the vehicle transmission to first and second rear drive axles. The system comprises torque dividing means within the tandem axle assembly and first and second torque transmitting means, such as the side gears of a differential. A first gear means transmits torque from the first differential side gear to the first rear drive axle and a second gear means transmits torque between the second differential side gear and the second rear drive axle. A third gear means is in engagement with the first gear means and may be clutched to a drive shaft to transmit torque directly from the tandem axle assembly to the front drive-steer axle, thus eliminating the need for a transfer case.

10 Claims, 4 Drawing Figures

DRIVE AXLE SYSTEM USEABLE IN 6 × 6 VEHICLE

This is a continuation of application Ser. No. 549,592, filed Feb. 13, 1975, now abandoned.

BACKGROUND OF THE DISCLOSURE

The present invention relates to drive axle systems for vehicles such as 6 × 6 vehicles, and more particularly, to an improved system for providing torque transmission to the front drive-steer axle.

A 6 × 6 vehicle is one having six wheels, all of which are driven, and abbreviatons such as 6 × 6 will be used hereinafter, the first numeral denoting the total number of vehicle wheels and the second numeral denoting the number of driven wheels. Therefore, although the present invention may be utilized with vehicles having a larger number of wheels, such as an 8 × 8 vehicle, as long as the front axle is driven, the invention is especially adapted for use with a 6 × 6 vehicle, and will be described in connection therewith.

Under normal driving conditions, a 6 × 6 vehicle operates as a 6 × 4 vehicle, i.e., the vehicle transmission delivers torque to the tandem axle assembly which in turn delivers the torque to the two rear axles, with the front drive-steer axle not being driven. It will become apparent, however, that the invention is equally adapted to a vehicle which operates, even under normal conditions, as a 6 × 6.

The essence of a tandem axle assembly is its ability to drive more than one drive axle, generally two or three rear axles. This is typically accomplished by means of a power (or torque) divider, usually a differential, in which one of the differential side gears transmits, under ideal operating conditions as hereinafter defined, a certain percentage of the input torque to the first drive axle while the other differential side gear transmits the remaining torque by means of an output shaft to a subsequent axle assembly including a second drive axle. A tandem assembly of the type well known in the art is illustrated in U.S. Pat. No. 3,000,456, assigned to the assignee of the present invention and which is incorporated herein by reference. The term "ideal operating conditions" as used herein shall refer to a situation wherein all driven wheels are of substantially equal radius and are smoothly rolling on the same substantially flat surface with no slippage occurring.

6 × 6 vehicle drive systems presently known in the art utilize a transfer case mounted either on the rear side of the vehicle transmission, driven directly by the transmission output shaft, or mounted to the vehicle chassis and driven by a drive line attached to the transmission output shaft and the transfer case input shaft. Examples of conventional 6 × 6 drive systems and the transfer cases utilized therein are shown in U.S. Pat. Nos. 2,770,150; 3,191,708; and 3,495,477. The use of such a transfer case involves additional gearing and substantially increases the weight and cost of such drive systems. Also, it is required that the transfer case be quite large to enable the output shaft from the transfer case to the front drive-steer axle to clear the transmission bell housing.

Accordingly, it is an object of the present invention to provide a vehicle drive system which is capable of transmitting torque to a front drive-steer axle, and which eliminates the necessity for a transfer case and the associated space requirements and additional weight and cost.

It is a more specific object of the present invention to provide such a drive system in a vehicle having a tandem axle assembly in which the gearing in the tandem axle assembly is directly utilized to provide the power take-off to drive the front drive-steer axle.

A further disadvantage of prior art 6 × 6 drive systems relates to the fact that the transfer case, when driving the front axle, must, under ideal operating conditions, generally transmit 50% of the torque to the tandem axle assembly and a 50% of the torque to the front axle. Such a distribution of the torque is disproportionate to the axle loadings in which, typically, 30% of the weight is on the front axle and 70% of the weight is on the rear axles. This 50–50% torque distribution remains generally constant until one of the axles loses traction, which would normally be the front drive-steer axle, because the proportion of the available torque transmitted to the front axle is greater than the proportion of the total weight on that axle. This fact places an undesirably low limit on the total torque which may be transmitted to the ground up to the point of loss of traction.

Accordingly, it is an object of the present invention to provide a 6 × 6 vehicle drive system in which the torque distribution is more nearly in conformity with the load distribution than has been possible with prior art drive systems.

It is a related object of the present invention to provide a vehicle drive system which achieves the above-stated object and increases the total torque output to the ground without loss of traction.

SUMMARY OF THE INVENTION

The above and other objects of the present invention are accomplished by the provision of a drive system operable to transmit torque from a vehicle transmission to first and second rear drive axles and a front drive axle. The drive system comprises a means for dividing the input torque received from the transmission, such as the differential of a tandem axle assembly, the torque dividing means including first and second torque transmitting means. A first gear means is in driving engagement between the first torque transmitting means and the first rear drive axle and a second gear means is in driving engagement between the second torque transmitting means and the second rear drive axle, the first and second torque transmitting means typically being the differential side gears. A third gear means is operable to be in driving engagement between the first gear means and the front drive axle.

In accordance with a more limited aspect of the present invention, under ideal operating conditions the first torque transmitting means receives substantially one-half of the input torque and the second torque transmitting means receives the remainder of the input torque. Then the first rear drive axle receives one-half of the torque delivered to the first torque transmitting means and the third gear means receives the remainder thereof.

DESCRIPTION OF THE PREFERRED EMBODIMENTS

Figure 1:
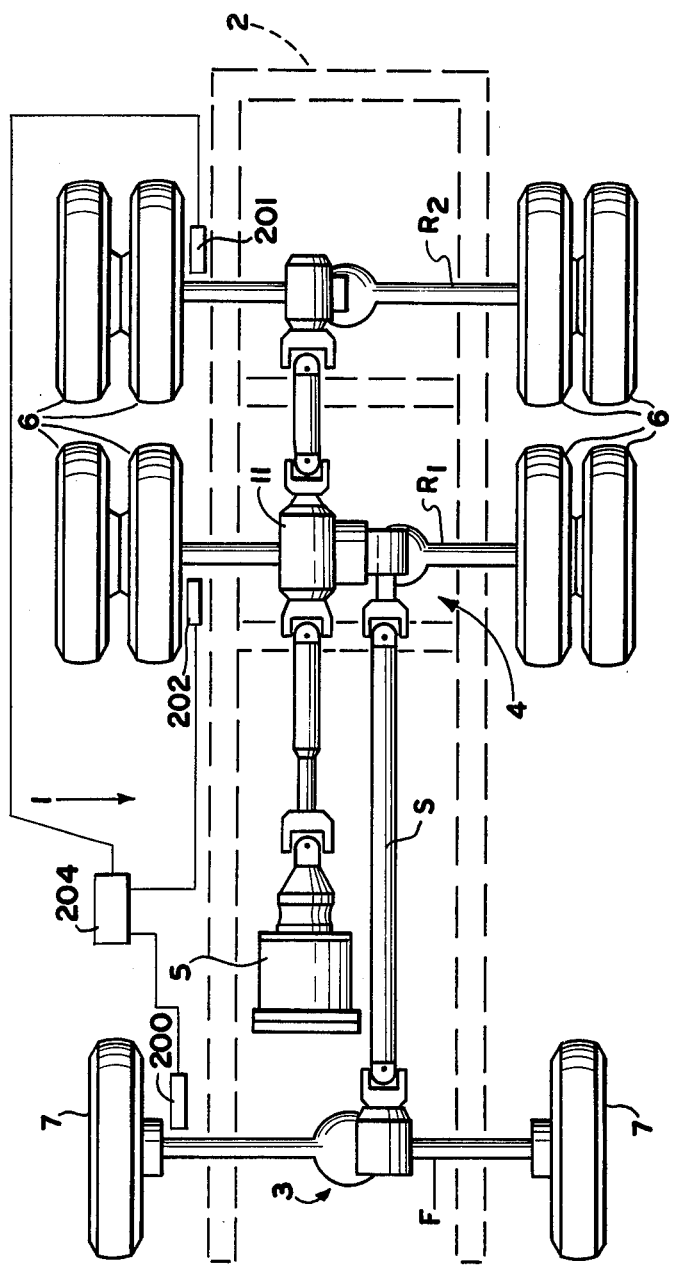
FIG. 1 is a semi-schematic top plan view showing the drive system of the present invention being utilized with a 6 × 6 vehicle.

Referring now to the drawings, which are for the purpose of illustrating a preferred embodiment of the invention, and not for limiting the same, FIG. 1 is a semi-schematic plan view showing only portions of the vehicle, in order to illustrate the vehicle drive system. The vehicle, generally designated 1, has a conventional frame 2 which is suitably supported by a front axle assembly 3 and a rear tandem axle assembly 4. A vehicle transmission 5 provides input torque to the tandem axle assembly 4. The illustrated vehicle has six wheel drive, i.e., a plurality of rear wheels 6 are driven and, under certain conditions, a pair of front wheels 7 are also driven. This is accomplished within the rear tandem axle assembly 4 by means of a tandem axle mechanism, generally designated 11, wherein the input torque is divided and transmitted to a pair of rear axles $R_1$ and $R_2$, as well as to a front drive-steer axle F by means of a drive shaft S. The particular gearing arrangement by which the above-described torque distribution is accomplished within tandem axle mechanism 11 will be described in greater detail in connection with FIGS. 2-4.

The vehicle 1 may also include a system for sensing a difference in rotational speed of the front drive-steer axle F and the first rear drive axle $R_1$ comprising sensor 200 for providing a signal proportional to the rotational speed of axle F, sensor 202 for providing a signal proportional to the rotational speed of axle $R_1$ and control 204 for comparing the two signals. A sensor 20 may be utilized to provide a signal proportional to rotational speed of second rrear drive axle $R_2$. Control 204 may be utilized to compare the rotational speeds of $R_1$ and $R_2$ with a differential exceeding a predetermined maximum indicating a potential loss of traction.

Figure 2:
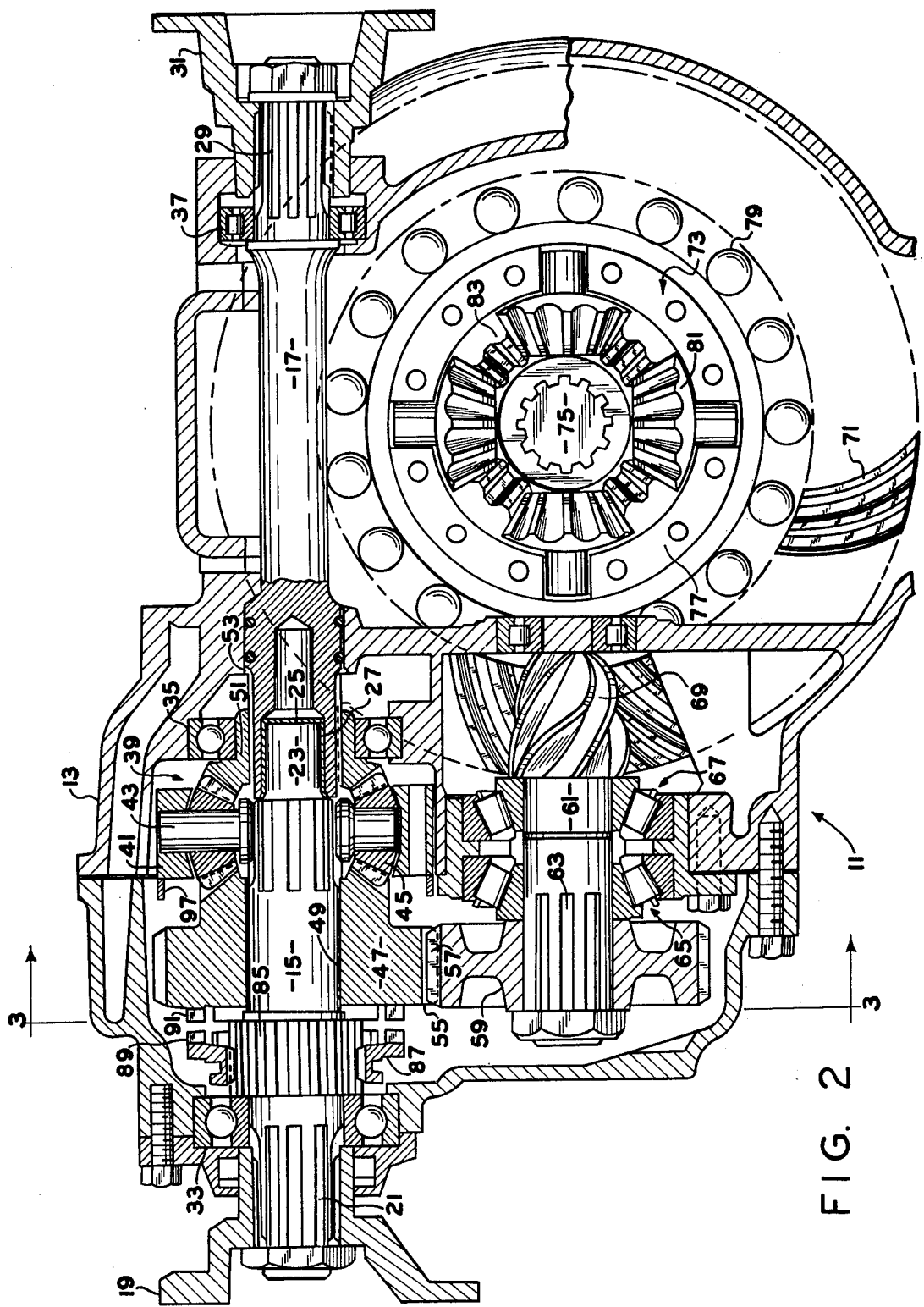
FIG. 2 is an axial cross section of a tandem axle assembly of the type used in the drive system shown in FIG. 1.

The tandem axle mechanism 11, shown in FIG. 2, comprises a housing assembly 13, within which is a pair of axially-aligned shaft members 15 and 17. The shaft member 15 is provided with a suitable universal coupling means 19 for connection with a propeller shaft or the like (not shown), to deliver input torque to the shaft member 15. The forward end of shaft member 15 is provided with a spline portion 21 for non-rotatable mounting of the universal coupling 19 thereon. At its opposite end, the shaft member 15 terminates in a hub 23 of reduced cross section which extends into, and is rotatable within, a bushing 25 seated within a socket portion 27 provided in the forward end of shaft member 17, shown partly in cross section. The opposite end of the shaft member 17 is provided with a spline portion 29 on which a universal coupling 31 is mounted. The shaft members 15 and 17 are rotatably supported within the housing 13 by suitable anti-friction bearings 33, 35 and 37.

Shaft member 15 transmits input torque from the propeller shaft to an inter-axle differential or power divider 39 which comprises a rotatable carrier or spider 41 within which are mounted a plurality of differential pinion shafts 43, each of which has rotatably mounted thereon a planet pinion gear 45. In meshing engagement with the planet pinions 45 is a differential side gear 47, which is rotatably supported on the shaft member 15 by suitable bushings 49. Also in meshing engagement with the planet pinion gears 45 is a differential side gear 51, a portion of which is seated against the inner race of bearing 35 and is drivingly connected to the shaft member 17 by a spline connection 53.

A portion of the input torque (generally about 50%) transmitted to the differential 39 is, in turn, transmitted to shaft member 17, while the remainder is transmitted to a pair of axle shafs in a manner described below. The differential side gear 47 has, about its outer surface, a set of gear teeth 55 which engagingly mesh a mating set of gear teeth 57 disposed about a gear member 59 which is connected to the forward end of a pinion shaft 61 by a spline connection 63. The pinin shaft 61 is rotatably supported within the housing 13 by sets of thrust bearings 65 and 67. The pinion shaft 61 terminates, opposite the spline connection 63, in a drive pinion 69 which transmits the remaining torque to a ring gear 71 which, in turn, transmits the torque by means of a differential 73 to a pair of axle shafts, including a right axle shaft 75 and a left axle shaft (not shown in FIG. 1). The differential 73 includes a carrier or spider 77 secured to the ring gear 71 as by suitable bolts or rivets 79. The spider 77 includes a plurality of planet pinions 81 in meshing engagement with a right differential side gear 83 and a left differential side gear (not shown).

The shaft member 15 further includes an intermediate spline portion 85 on which is slidably mounted a clutch member 87 which has, extending rearwardly, a set of clutch teeth 89 for engagement with a mating set of clutch teeth 91 provided on the forward face on the differential side gear 47.

The function of this clutch arrangement will be described in greater detail subsequently.

Figure 3:
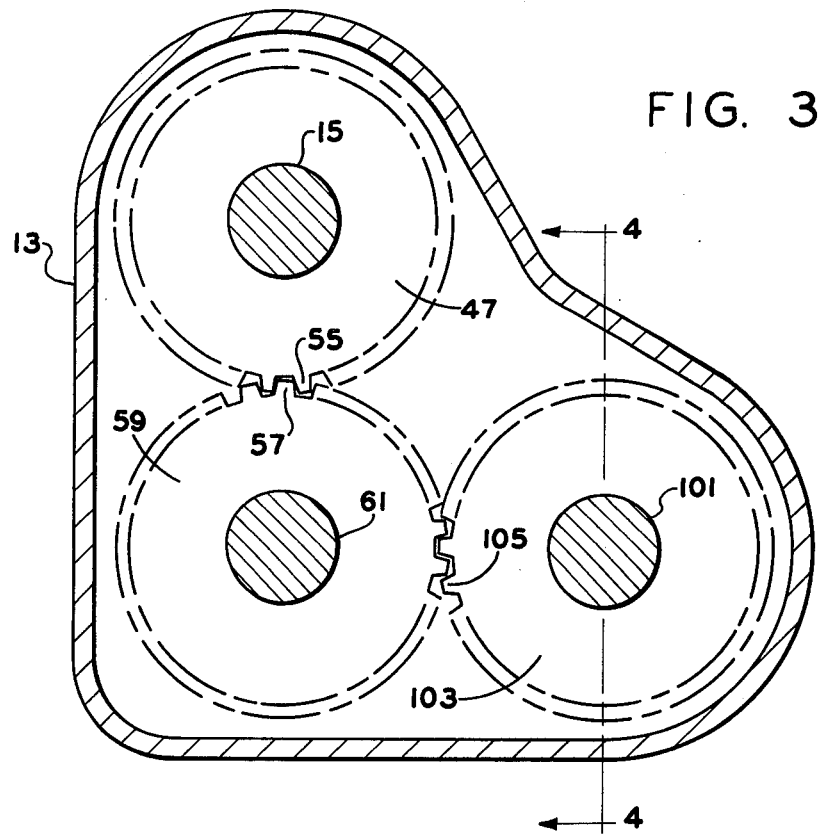
FIG. 3 is a semi-schematic, transverse cross section taken on line 3—3 of FIG. 2, and on the same scale.
Figure 4:
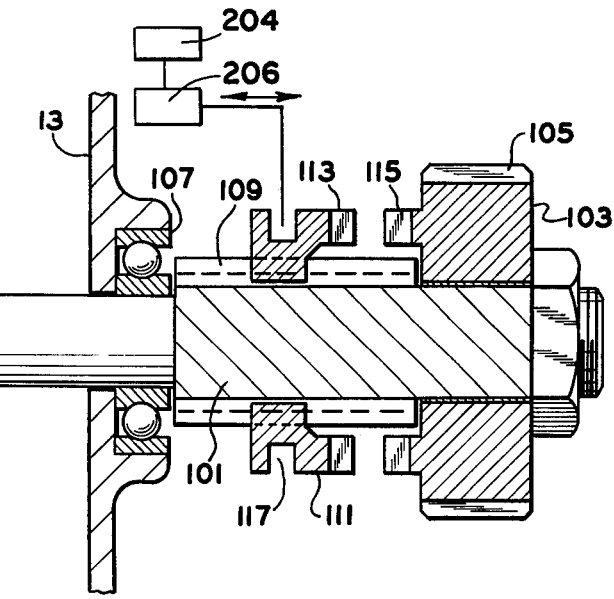
FIG. 4 is an axial cross section taken on line 4—4 of FIG. 3, and on the same scale.

Referring now to FIGS. 3 and 4, FIG. 3 is a cross section showing differential side gear 47 and gear member 59. Spaced apart from pinion shaft 61, and extending generally parallel thereto, is a shaft 101. A helical output gear 103 is, under normal drive conditions, freely rotatable about shaft 101. About its outer periphery, gear 103 has a plurality of teeth 105 in toothed engagement with the gear teeth 57 of gear member 59. Shaft 101 projects forwardly (to the left in FIG. 4) out of housing assembly 13 and is rotatably supported therein by suitable bearing means 107. The shaft 101 extends forwardly to a point (not shown in FIG. 4) where it drivingly engages the drive shaft S which in turn drives the front drive-steer axle F by any one of the front axle drive mechanisms well known in the art.

Drive shaft 101 includes a spline portion 109 which is in splined engagement with the internal splines of a clutch member 111, which has a set of clutch teeth 113 for engagement with a mating set of clutch teeth 115 provided on the forward face of the gear member 103. The clutch member 111 defines an annular groove 117 for engagement with a shift fork (not shown), for sliding clutch member 111 into and out of engagement with gear member 103. The shift fork (not shown) may be operated by an actuator 206 which is controlled by the control 204 in response to rotational speed differential between axle F and axle $R_1$, axle $R_1$ and $R_2$ and/or axle F and $R_2$, corresponding to a sensed loss of traction.

It will be appreciated by those skilled in the art that when clutch member 87 is slid into a position with clutch piece 89 engaged clutch teeth 91, interaxle differential 39 is locked so that the differential side gears 47 and 51 each receive about 50% of the input torque under ideal operating conditions. It will also be appreciated by those skilled in the art, that under ideal operating conditions, when interaxle differential 39 is not locked but is free to differentiate, the differential side gears 47 and 51 will receive about 50% of the input torque. Thus, under ideal operating conditions, when clutch member 87 is not engaged with clutch 89 and when clutch teeth 113 engage clutch teeth 115, utilizing the present invention results in approximately 25% of the input torque being transmitted to the front axle F approximately 25% of the input torque being delivered to the rear axle $R_1$ and approximately 50% of the input torque being delivered to the rear axle $R_1$.

The following example is included to illustrate quantitatively the advantage gained by the use of the present invention, i.e., the additional torque output to the ground. In the example, it is assumed that operation is under ideal conditions and the total load on the vehicle is 55,000 lbs. (2.49 × 10⁴ kg.) which is distributed over the axles as shown in the column entitled "Weight." The two columns under the heading "Transfer Case" indicate conventional torque distribution percentage and torque delivered to the ground through the respective axle (based on the assumption that the traction limitation is 1 foot pound of torque for every pound of load). Under the heading "Invention" is given the torque distribution percentage and torque output to the ground using the 6 × 6 vehicle drive system of the present invention.

|   | Weight | Transfer Case | | Invention | |
|---|---|---|---|---|---|
|   |   | % | Torque | % | Torque |
| F | 15,000# | 50 | 15,000 ft.-# | 25 | 10,000 ft.-# |
|   | (6.81 × 10⁴ kg.) |   | (2.03 × 10⁴ N · m) |   | (1.35 × 10⁴ N · m) |
| $R_1$ | 20,000 # | 25 | 7,500 ft.-# | 25 | 10,000 ft.-# |
|   | (9.05 × 10⁴ kg.) |   | (1.015 × 10⁴ N · m) |   | (1.35 × 10⁴ N · m) |
| $R_2$ | 20,000 # | 25 | 7,500 ft.-# | 50 | 20,000 ft.-# |
|   | (9.05 × 10⁴ kg.) |   | (1.015 × 10⁴ N · m) |   | (2.70 × 10⁴ N · m) |
| Total | 55,000 # | 100 | 30,000 ft.-# | 100 | 40,000 ft.-# |
|   | (2.49 × 10⁵ kg.) |   | (4.06 × 10⁴ N · m) |   | (5.4 × 10⁴ N · m) |

It may be seen that within the conventional drive system (i.e., using a transfer case), the front drive-steer axle breaks loose at a torque of 15,000 ft.-lbs., thus impairing steering ability and limiting total torque output to 30,000 ft.-lbs., whereas, with the drive system of the invention, it is rear axle $R_2$ which loses traction, but only after a torque output of 20,000 ft.-lbs., thus permitting a total torque output of 40,000 ft.-lbs In connection with the operation of the drive system disclosed hereinabove, it will be apparent that a means must be provided for actuating the engagement of clutch members 87 and 111, either simultaneously, or sequently (preferably, with clutch member 87 being engaged before clutch member 111). The clutch members 87 and 111 may be activated by any one of a number of means well known in the art such as a pneumatic piston or an electrical solenoid. Manual control for these actuation means may be provided so that under certain driving conditions, such as a loss of traction, the driver can manually actuate both of the clutch members simultaneously to provide a locked 6 × 6 vehicle, or actuate only clutch member 87 to lock together rear drive axles $R_1$ and $R_2$, or actuate clutch member 111 to lock front drive axle F to the rear drive axle $R_1$, without locking rear drive axle $R_2$.

Alternatively, it is possible, and generally preferable to provide an automatic actuation system for the clutch members 87 and 111 in response to automatically sensing more than a predetermined speed differential between certain elements of the system which are normally intended to rotate at the same speed, such as drive axles $R_1$ and $R_2$ or differential side gears 47 and 51. An automatic actuation system of the type useable to actuate clutch members 87 and 111 has been described and claimed in copending application Ser. No. 492,925, filed July 30, 1974, entitled "Automatic Locking Multiple Drive Axle Assembly," and assigned to the assignee of the present invention. While the system disclosed in the referenced application teaches automatic lockup of the inter-axle differential (inter-axle differential 39 in the present application), it will be apparent to those skilled in the art that such an automatic lockup system is readily adaptable for engaging clutch member 111.

The invention has been described in detail sufficient to enable one of ordinary skill in the art to make and use the same. Modifications and alterations of the preferred embodiment will occur to others upon a reading of the specification and it is our intention to include all such modifications and alterations insofar as they come within the scope of the appended claims.

We claim:

1. A tandem axle drive system operable to transmit torque from a vehicle transmission to first and second rear drive axles and a front drive axle, said drive system comprising:
   a. means for dividing input torque received from said transmission, said torque dividing means including first and second torque transmitting means, said first torque transmitting means receiving substantially one-half of said input torque under ideal operating conditions and said second torque transmitting means receiving the remainder of the input torque;
   b. first gear means in driving engagement between said first torque transmitting means and first rear drive axle;
   c. second gear means in driving engagement between said second torque transmitting means and said second rear drive axle;
   d. third gear means in engagement with said first gear means;
   e. shaft means operable to be in driving engagement between said third gear means and said front drive axle; and
   f. clutch means shiftable between a position permitting free running of said third gear means with respect to said shaft means, and a position providing driving engagement between said third gear means and said shaft means.

2. A drive system as defined in claim 1 wherein under ideal operating conditions said first rear drive axle receives substantially one-half of the torque delivered to said first torque transmitting means and said third gear means receives the remainder thereof.

3. A drive system as defined in claim 2 wherein said torque dividing means comprises a differential gear set, said first torque transmitting means comprises a first differential side gear and said second torque transmitting means comprises a second differential side gear.

4. A drive system as defined in claim 3 wherein said first gear means comprises a pinion gear in meshing engagement with said first differential side gear.

5. A drive system as defined in claim 4 wherein said third gear means comprises an output gear in meshing engagement with said pinion gear.

6. A tandem axle drive assembly for receiving an input torque from a vehicle transmission and transmitting torque to first and second rear drive axles and to a shaft in driving engagement with a front drive axle, said tandem axle drive assembly comprising:
   a. means for dividing said input torque, said torque dividing means comprising a differential gear set including first and second differential side gear, each of said side gears receiving substantially one-half of the input torque under ideal operating conditions;
   b. first gear means for transmitting torque from said first differential side gear to said first rear drive axle;
   c. second gear means for transmitting torque from said second differential side gear to said second rear drive axle; and
   d. third gear means in meshing engagement with said first gear means operable to transmit torque from said first gear means to said shaft in response to a loss of traction at either of said first and second rear drive axles, said shaft receiving substantially one-half the torque supplied to said first differential side gear under ideal operating conditions.

7. A tandem axle drive assembly as defined in claim 6 wherein said third gear means includes an output gear in engagement with said first gear means and a clutch means shiftable to a position providing driving engagement between said output gear and said shaft.

8. A tandem axle drive assembly as defined in claim 7 including means for sensing the occurrence of more than a predetermined difference between the rotational speed of said front drive axle and that of one of said rear drive axles.

9. A tandem axle drive assembly as defined in claim 8 wherein said differential gear set includes lockup means to prevent differential action between said first and second differential side gears.

10. A tandem axle drive assembly as defined in claim 9 including means for sensing a difference in the rotational speeds of said first and second rear drive axles, and means for actuating said lockup means in response to the occurrence of a rotational speed difference in excess of a predetermined limit.

* * * * *

UNITED STATES PATENT AND TRADEMARK OFFICE
CERTIFICATE OF CORRECTION

PATENT NO. : 4,050,534
DATED : September 27, 1977
INVENTOR(S) : Robert K. Nelson; James F. Mueller It is certified that error appears in the above–identified patent and that said Letters Patent are hereby corrected as shown below:

Col. 3, line 36:      "20" should read "201".

line 38:      "rrear" should read "rear".

Col. 4, line 9:      "shafs" should read "shafts".

Col. 5, line 12:      "$R_1$" should read "$R_2$".

Col. 6, line 46:      "and first rear" should read "and said first rear".

Signed and Sealed this

Seventeenth Day of January 1978

[SEAL]

Attest:

RUTH C. MASON
*Attesting Officer*

LUTRELLE F. PARKER
*Acting Commissioner of Patents and Trademarks*